(12) United States Patent
Hauer

(10) Patent No.: US 6,534,209 B1
(45) Date of Patent: Mar. 18, 2003

(54) METHOD AND DEVICE FOR FILLING A FUEL CELL STACK

(75) Inventor: Karl-Heinz Hauer, Braunschweig (DE)

(73) Assignee: Volkswagen AG, Wolfburg/Fallersleben (DE)

( * ) Notice: Subject to any disclaimer, the term of this patent is extended or adjusted under 35 U.S.C. 154(b) by 0 days.

(21) Appl. No.: 09/463,469
(22) PCT Filed: Jul. 10, 1998
(86) PCT No.: PCT/EP98/04313
§ 371 (c)(1), (2), (4) Date: Apr. 27, 2000
(87) PCT Pub. No.: WO99/05739
PCT Pub. Date: Feb. 4, 1999

(30) Foreign Application Priority Data

Jul. 26, 1997 (DE) .......................... 197 32 305

(51) Int. Cl.[7] .............................. H01M 8/04; H01M 8/24
(52) U.S. Cl. ............................ 429/13; 429/23; 429/25; 429/34; 429/38
(58) Field of Search ............................ 429/13, 22, 23, 429/25, 34, 38

(56) References Cited

U.S. PATENT DOCUMENTS

| 3,496,022 A | 2/1970 | Lit |
| 4,243,731 A | 1/1981 | Cheron .......................... 429/13 |
| 4,693,945 A * | 9/1987 | Ohyauchi et al. ............. 429/21 |
| 6,251,534 B1 * | 6/2001 | McElroy ....................... 429/13 |

FOREIGN PATENT DOCUMENTS

| EP | 0 052 265 | 5/1982 |
| JP | 61 027071 | 2/1986 |
| JP | 01 030174 | 2/1989 |
| JP | 01 298653 | 12/1989 |
| JP | 04 274171 | 9/1992 |
| JP | 04 274174 | 9/1992 |
| JP | 07 249419 | 9/1995 |
| JP | 09 082348 | 3/1997 |
| JP | 63-195968 | * 8/1998 |
| WO | WO 98/21771 | * 5/1998 |

* cited by examiner

Primary Examiner—Patrick Ryan
Assistant Examiner—Jonathan Crepeau
(74) Attorney, Agent, or Firm—Kenyon & Kenyon

(57) ABSTRACT

The present invention relates to an improved fuel cell stack comprising a plurality of fuel cells connected in series and method for operation so that portions of the stack can be switched to parallel operation in response to an actuating signal by means of supplemental gas-intake ports having closable valves and optionally supplemental gas-exhaust ports having closable valves.

10 Claims, 1 Drawing Sheet

METHOD AND DEVICE FOR FILLING A FUEL CELL STACK

FIELD OF THE INVENTION

The present invention relates to a method and a device for filling a fuel cell stack, including a plurality of fuel cells connected to one another in series, and at least one gas-intake and at least one gas-exhaust port, so that all or some portion of the individual cells in the series can be operated in parallel.

BACKGROUND OF THE INVENTION

In order to attain sufficiently large voltages or currents, it is known to combine a plurality of fuel cells of the same kind to form a fuel cell stack. For this purpose, the fuel cells are connected in parallel and/or in series and have a common intake port and exhaust port. If the fuel cell stacks are not supplied with pure fuel gas, then a fuel-gas concentration gradient results on the anode side from the gas-intake port to the gas-exhaust port. For example, this is the case when operating with a series-connected methanol reformer for generating hydrogen. In this case, the composition of the anode gas at the gas intake is about 55% $H_2$, 22% $N_2$, 22% $CO_2$ and 1% $O_2$, whereas the $H_2$ concentration at the gas exhaust can have decreased by up to 10%. Then, the volume percentages of the other gases are correspondingly higher. To operate with a high efficiency factor, i,e., as much hydrogen as possible should be converted in the fuel cells, the fuel gas is passed through all of the available fuel cells using two or more fuel cell stacks connected in series, so that the hydrogen concentration at the gas exhaust is ideally zero. At the same time, the power output of the fuel cell decreases with the fuel gas concentration at the anode, i.e., the output of the fuel cells in front of the gas exhaust is lower than that of the first fuel cells directly behind the gas intake.

To operate with high power output, all of the cells and stacks can be supplied with gas simultaneously; however, the concentration of hydrogen in the exhaust gas is higher than in the series-connected fuel cell stacks first described.

When using fuel cells in motor vehicles, it is first of all desirable that as much power as possible be available for accelerating and driving at high speed, the efficiency of the energy conversion being of secondary importance in this case. On the other hand, it is desirable during part-throttle operation, e.g., while driving at constant speed or driving in the city without accelerating hard, to achieve as high an energy conversion efficiency as possible, to increase the driving range with a full tank and lower the operating costs.

Therefore, the present invention is based on the technical problem of providing a method and a device for filling fuel cell stacks, which fulfill the two above-mentioned requirements satisfactorily.

OBJECTS AND SUMMARY OF THE INVENTION

By providing a gas-intake port having a closable gas flap valve to each fuel cell or a group of fuel cells, the gas-flap valve being operable by an actuating signal, it is possible to switch between the high-efficiency and the high-output operating modes. The fuel cell stack can be operated predominantly in a high-efficiency mode, i.e., dosed gas-flap valves; and then the gas-flap valves can be opened to supply individual fuel cells or groups of fuel cells with additional fuel gas when a high power output is required, e.g., when accelerating.

The present invention provides an improved fuel cell stack comprising a plurality of fuel cells connected in series including a first fuel cell having at least one main-gas intake port and a last fuel cell having at least one main gas-exhaust port; and a supplemental gas intake port having a closable valve disposed between the main gas intake port and the main gas-exhaust port.

The invention also provides an improved method for filling a fuel cell stack, including a plurality of fuel cells connected in series including a first fuel cell having a main gas-intake port and a last fuel cell having a main gas exhaust port, and at least one supplemental gas-intake port having a closable valve operable by an activating signal, which comprises a) generating an actuating signal as a function of the fuel cells power output; and b) opening and closing the supplemental gas intake port valve in response to the actuating signal.

The present invention further provides an improved method for filling a fuel cell stack, including a plurality of fuel cells connected in series including a first fuel cell having a main gas-intake port and a last fuel cell having a main gas-exhaust port, and at least one supplemental gas-intake port having a closable valve operable by an actuating signal, which includes: a) generating an actuating signal as a function of the fuel stacks power output requirement; b) opening and closing the supplemental gas-intake port valve in response to the actuating signal; and c) measuring pressure-drop across the fuel cell stack and generating the actuating signal as a function of a threshold value for the pressure drop.

BRIEF DESCRIPTION OF THE DRAWING

The foregoing and other objects, aspects and advantages will be better understood from the following detailed description of a preferred embodiment of the invention with reference to the following drawing in which.

DETAILED DESCRIPTION OF THE INVENTION

Figure 1:
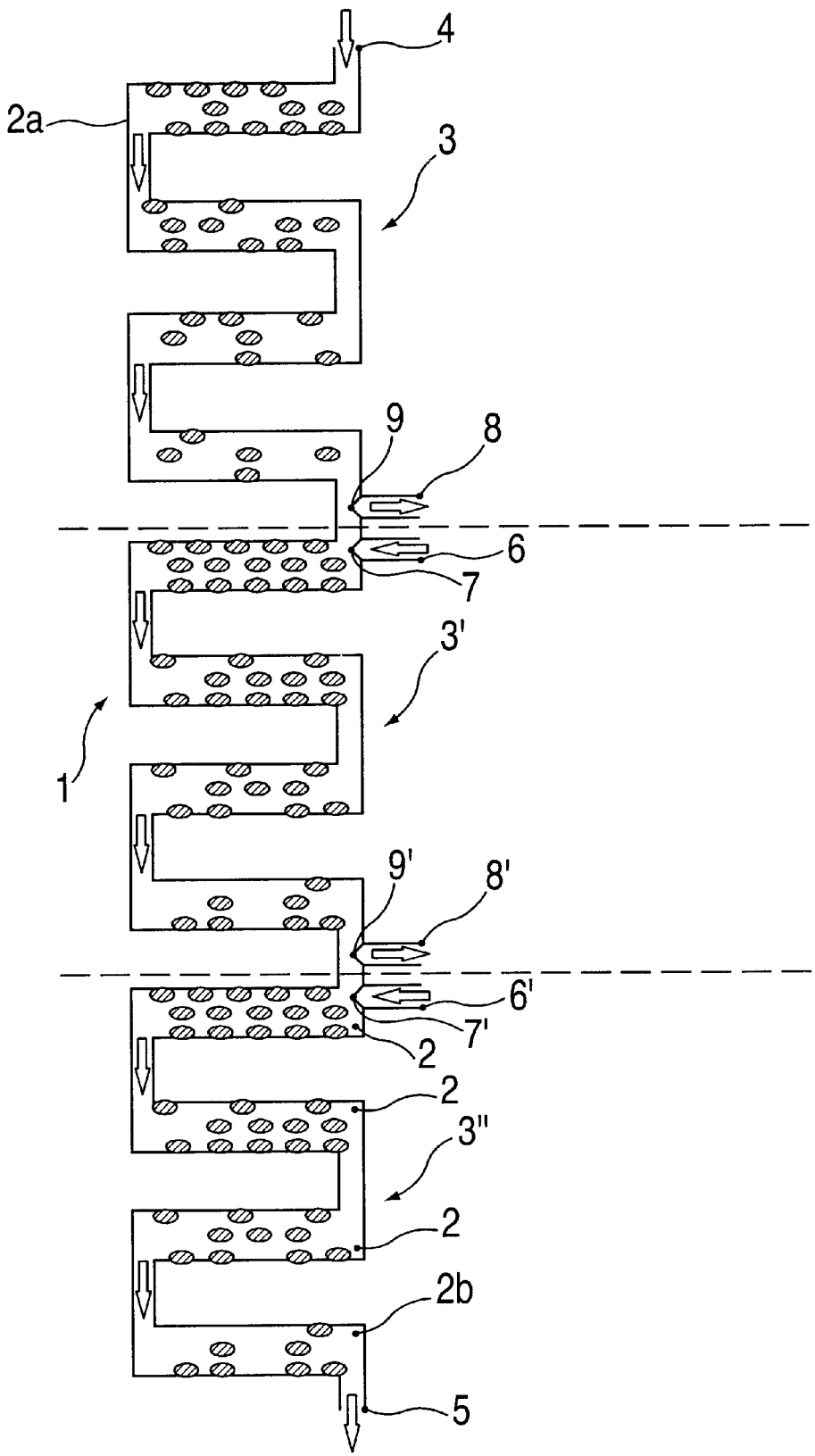
FIG. 1, shows a schematic side view of a fuel cell stack

Fuel cell stack 1 includes twelve fuel cells 2, which are combined in three groups 3, each group having four fuel cells 2. Fuel cells 2 are connected to each other in series. First fuel cell 2a has a gas-intake port 4, and last fuel cell 2b has a gas-exhaust port 5. Additional (supplemental) gas-intake ports 6 and 6' having closable gas-flap valves 7 and 7', are provided to each first cell 2 in groups 3' and 3', and additional (supplemental) gas-exhaust ports 8 and 8" having gas-flap valves 9 and 9', are provided to each last cell 2 in groups 3 and 3'. The first group 3 of cells uses only gas-intake port 4 and last group 3" uses only (main) gas-exhaust port 5. Preferably, all gas-flap valves 7, 7', 9 and 9' are actuated by a common actuating signal.

When a high-efficiency operating mode is desired, then gas-flap valves 7, 7', 9 and 9' are controlled in such a way that they close corresponding gas-intake ports 6 and 6' and gas-exhaust port 8 and 8'. The anode gas to be converted in fuel cell stack 1 is fed into gas-intake port 4 and successively flows through all fuel cells 2 in series. Then, the converted anode gas exits the fuel cell stack 1 through gas-exhaust port 5.

If a high-output operating mode is desired, then gas-flap valves 7, 7', 9 and 9' are opened and the flow of anode gas appropriately diverted, so that each of the fuel cell groups 3 are fed with anode gas simultaneously. If the pressure drop in the fuel cell stack is sufficiently large to supply enough fresh anode gas to fuel cells 2 through gas-intake ports 4, 6 and 6' then it is possible to dispense with additional gas-exhaust ports 8 and 8'. The actuating signal for gas-flap valves 7, 7', 9 and 9' is generated preferably by a motor control unit and/or a battery manager which can easily detect the required output. The cathode side is not affected by the switchover when the cathode gas is normal ambient air. In other cases, e.g., when operating with pure oxygen, a switchover of the gas streams corresponding to the anode can be provided for the cathode. The electronic interconnection of fuel cell stack 1 is not affected by any of these measures.

A preferred field of application of the present invention is the use in motor vehicles, particularly those that employ having a methanol reformer connected in series.

I claim:

1. An improved fuel cell stack, comprising:

a plurality of fuel cells connected in series including a first fuel cell having at least one main gas-intake port and a last fuel cell having at least one main gas-exhaust port; and at least one fuel cell including a supplemental gas-intake port having a closable valve, said supplemental gas-intake port being disposed between the main gas-intake port and the main gas-exhaust port.

2. The improved fuel cell of claim 1, further comprising at least one supplemental gas-exhaust port having a closable valve disposed between the main gas-intake port and the supplemental gas-intake port so that portions of the fuel cell stack can be operated in parallel.

3. The improved fuel cell of claim 2, further comprising a plurality of supplemental gas-intake ports having closable valves and a plurality of supplemental gas-exhaust ports having closable valves so that the fuel cell stack can be divided into a plurality of portions that can be operated in parallel.

4. The improved fuel cell of claim 1, 2 or 3, wherein at least one supplemental gas-intake port valve is a gas flap valve operable by an actuating signal.

5. The improved fuel cell of claim 1, 2 or 3, wherein at least one gas-exhaust port valve is a gas flap valve operable by an actuating signal and wherein at least one supplemental gas-intake valve is a flap valve operable by an actuating signal.

6. An improved method for filling a fuel cell stack, including a plurality of fuel cells connected in series including a first fuel cell having a main gas-intake port and a last fuel cell having a main gas-exhaust port, and at least one fuel cell including a supplemental gas-intake port having a closable valve operable by an actuating signal, the supplemental gas-intake port disposed between the main gas-intake port and the main gas-exhaust port, which comprises:

a) generating an actuating signal as a function of the fuel stacks power output requirement; and b) opening and closing the supplemental gas-intake port valve in response to the actuating signal.

7. An Improved method for filling a fuel cell stack, including a plurality of fuel cells connected in series including a first fuel cell having a main gas-intake port and a last fuel cell having a main gas-exhaust port, at least one supplemental gas-intake port having a closable valve operable by an actuating signal and at least one supplemental gas-exhaust port having a closable valve, which comprises:

a) generating an actuating signal as a function of the fuel stacks power output requirement;

b) opening and closing the supplemental gas-intake port valve in response to the actuating signal; and c) opening and closing the supplemental gas-exhaust port valve in response to the actuating signal.

8. The improved method of claim 2, wherein the supplemental gas-intake port valve and the supplemental gas-exhaust valve are closed in one mode of operation so that the fuel cells are connected in series and in a second mode of operation some or all of the fuel cells function connected essentially in parallel.

9. An improved method for filling a fuel cell stack, including a plurality of fuel cells connected in series including a first fuel cell having a main gas-intake port and a last fuel cell having a main gas-exhaust port, and at least one supplemental gas-intake port having a closable valve operable by an actuating signal, which comprises:

a) generating an actuating signal as a function of the fuel stacks power output requirement;

b) opening and closing the supplemental gas-intake port valve in response to the actuating signal; and c) measuring pressure-drop across the fuel cell stack and generating the actuating signal as a function of a threshold value for the pressure drop.

10. The improved method of claim 2, wherein the actuating signal opens the supplemental exhaust port valve if the pressure-drop falls below the threshold value.

* * * * *

UNITED STATES PATENT AND TRADEMARK OFFICE
CERTIFICATE OF CORRECTION

PATENT NO. : 6,534,209 B1
DATED : March 18, 2003
INVENTOR(S) : Karl-Heinz Hauer

It is certified that error appears in the above-identified patent and that said Letters Patent is hereby corrected as shown below:

Column 1,
Line 63, change "dosed" to -- closed --.

Column 2,
Line 38, change "stack" to -- stack. --.

Signed and Sealed this

Twelfth Day of October, 2004

JON W. DUDAS
*Director of the United States Patent and Trademark Office*